US009685047B2

(12) United States Patent
Sun

(10) Patent No.: US 9,685,047 B2
(45) Date of Patent: Jun. 20, 2017

(54) SELF-SERVICE LOTTERY MACHINE

(71) Applicants: BOE TECHNOLOGY GROUP CO., LTD., Beijing (CN); BOE OPTICAL SCIENCE AND TECHNOLOGY CO., LTD., Suzhou (CN)

(72) Inventor: Xiuli Sun, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 344 days.

(21) Appl. No.: 14/492,662

(22) Filed: Sep. 22, 2014

(65) Prior Publication Data

US 2015/0339893 A1     Nov. 26, 2015

(30) Foreign Application Priority Data

May 22, 2014  (CN) .......................... 2014 1 0219733

(51) Int. Cl.
*G07F 17/42* (2006.01)
*G07F 17/32* (2006.01)
(Continued)

(52) U.S. Cl.
CPC ............ *G07F 17/42* (2013.01); *G06F 3/0488* (2013.01); *G06F 3/0489* (2013.01);
(Continued)

(58) Field of Classification Search
USPC .................................... 463/17, 18
See application file for complete search history.

(56) References Cited

U.S. PATENT DOCUMENTS 7,942,315 B2 *  5/2011  He ....................... G06K 9/6226
                                                    235/375
2008/0182639 A1  7/2008  Antonopoulos et al.
(Continued)

FOREIGN PATENT DOCUMENTS

CN            2884341 Y       3/2007
CN          201278166 Y       7/2009
(Continued)

OTHER PUBLICATIONS

First Office Action regarding Chinese application No. 201410219733.4, dated Sep. 21, 2015. Translation provided by Dragon Intellectual Property Law Firm.
(Continued)

*Primary Examiner* — Pierre E Elisca
(74) *Attorney, Agent, or Firm* — Harness, Dickey & Pierce, P.L.C.

(57) ABSTRACT

The present invention provides a self-service lottery machine, comprising a casing forming an accommodation space; a display device for providing a lottery self-service sales operation interface, which including a touch display screen; a coin-feed and card reading integrated module for completing payment, which including a coin-feed and card reading operation interface; a data input module for implementing keyboard input, the data input module including an input keyboard; and a main board for completing lottery self-service sales according to user's operation received by the data input module, the coin-feed and card reading integrated module and the display device, wherein the display device, the coin-feed and card reading integrated module, the data input module and the main board are arranged inside the accommodation space, and the touch display screen, the coin-feed and card reading operation interface and the input keyboard are all exposed from a first face casing of the casing.

17 Claims, 9 Drawing Sheets

(51) Int. Cl.
*G06F 3/0488* (2013.01)
*G06F 3/0489* (2013.01)

(52) U.S. Cl.
CPC ........ *G07F 17/329* (2013.01); *G07F 17/3209* (2013.01); *G07F 17/3246* (2013.01)

(56) References Cited

U.S. PATENT DOCUMENTS

| | | | |
|---|---|---|---|
| 2009/0057395 A1* | 3/2009 | He | G06K 9/6226 235/379 |
| 2011/0054677 A1* | 3/2011 | Liddell | G06Q 10/06 700/236 |

FOREIGN PATENT DOCUMENTS

| | | |
|---|---|---|
| CN | 202085256 U | 12/2011 |
| CN | 102637315 A | 8/2012 |
| CN | 202404673 U | 8/2012 |

OTHER PUBLICATIONS

Second Office Action regarding Chinese application No. 201410219733.4, dated Apr. 20, 2016. Translation provided by Dragon Intellectual Property Law Firm.

* cited by examiner

SELF-SERVICE LOTTERY MACHINE

CROSS-REFERENCE TO RELATED APPLICATION

The present application claims priority to the Chinese application No. 201410219733.4 filled on May 22, 2014 and entitled with "a self-service lottery machine", the entire contents of which are incorporated herein by reference.

TECHNICAL FIELD

The present invention relates to the technical field of automation equipments, in particular to a self-service lottery machine.

BACKGROUND

Currently, lotteries are purchased mostly from lottery distribution points, and the manner of selling lotteries by a specially-appointed man is usually adopted in the lottery distribution points. The specially-appointed man is responsible for collecting money, operating equipments, printing lotteries, but fails to meet the requirement of a plurality of buyers to buy the lotteries and check winning conditions at the same time, thereby decreasing marketing efficiency and affecting sales of the lotteries.

SUMMARY

The purpose of the technical solution of the present invention is to provide a self-service lottery machine to meet the requirement of self-service purchasing lotteries.

The present invention provides a self-service lottery machine, comprising a casing forming an accommodation space, wherein the self-service lottery machine further comprises:

a display device for providing a lottery self-service sales operation interface, the display device including a touch display screen;

a coin-feed and card reading integrated module for completing payment, the coin-feed and card reading integrated module including a coin-feed and card reading operation interface;

a data input module for implementing keyboard input, the data input module including an input keyboard; and a main board for completing lottery self-service sales according to user's operation received by the data input module, the coin-feed and card reading integrated module and the display device, wherein the display device, the coin-feed and card reading integrated module, the data input module and the main board are arranged inside the accommodation space, and the touch display screen, the coin-feed and card reading operation interface and the input keyboard are all exposed from a first face casing of the casing.

Preferably, the self-service lottery machine as described above further comprises:

a print module for printing lotteries, the print module including a print delivery outlet;

a scan module for scanning sold lotteries, the scan module including a scan port, wherein the print module and the scan module are arranged inside the accommodation space, and the print delivery outlet and the scan port are also exposed from the first face casing.

Preferably, the self-service lottery machine as described above further comprises: a bottom casing connected to the first face casing and two opposite side casings, each of the side casings connected to the first face casing and the bottom casing respectively, wherein each of the side casings is formed to be a "L" shape, and an angle of the first face casing relative to the bottom casing is less than 90 degrees and greater than 0 degree.

Preferably, the first face casing is rectangular and includes a first side and a second side which are opposite, and a third side formed at a place where the first face casing is connected with the bottom casing, the third side being connected with the first side and the second side respectively, wherein the coin-feed and card reading operation interface and the touch display screen are arranged in sequence from the first side to the second side, the input keyboard is arranged between the coin-feed and card reading operation interface and the third side, the print delivery outlet and the scan port are arranged between the touch display screen and the third side, and the print delivery outlet and the scan port are arranged side by side along a length direction of the third side.

Preferably, the casing further comprises a second face casing opposite to the first face casing, the second face casing including a main casing, a first closed casing corresponding to the position where the print module is provided, a second closed casing corresponding to the position where the coin-feed and card reading integrated module is provided and a third closed casing for closing or exposing a money storage box.

Preferably, the money storage box is arranged at the bottom of the accommodation space, and the third closed casing is provided with a handle and a box closed lock catch for locking the money storage box.

Preferably, the main casing is provided with a complete machine lock catch.

Preferably, the print module and the money storage box are arrange side by side, the print module is also arranged at the bottom of the accommodation space, the main board is positioned above the print module, a cover plate for fixing the main board is parallel with the first face casing and positioned at a position corresponding to the touch display screen; the coin-feed and card reading integrated module is located right above the money storage box.

Preferably, the self-service lottery machine further comprises a first power supply for supplying the display device, the coin-feed and card reading integrated module and the data input module with power energy, and the print module includes a second power supply for supplying print output with power energy, wherein the first power supply is different from the second power supply.

Preferably, the casing is provided with foot pads.

Preferably, the first closed casing and the second closed casing are formed to be a structure protruding from the main board, and the first closed casing and the second closed casing are arranged separately from the main casing respectively so that the first closed casing and the second closed casing can be opened individually in a case of not opening the main casing.

Preferably, the self-service lottery machine is provided with a power interface, a network interface and a switch interface, which are arranged on the second face casing.

Preferably, the coin-feed and card reading operation interface includes a coin slot and a card swiping opening, a card insertion port of the card swiping opening is designed in an arc shape, and front bottom surface of the card swiping opening is parallel with the first face casing.

Preferably, inside the print delivery outlet and the scan port is provided with a paper feeding guide groove.

Preferably, a height of a paper outlet of a print head of the print module is in abutting connection with the paper feeding guide groove of the print delivery outlet in a parallel and level mode.

At least one of the technical solutions in the embodiment of the present invention has the following advantages:

The self-service lottery machine in the present invention comprises a display device, a coin-feed and card reading integrated module, a data input module and a main board. The display device is used for providing users with operation interfaces in lottery self-service sales and receiving operation input performed by the user on the touch display screen. The coin-feed and card reading integrated module is used for completing payment of lottery self-service sales. The data input module is used for receiving data input performed by the user via a keyboard, and the main board is used for controlling the work among the components above. The combination of the components realizes the self-service sales of lotteries. Moreover, the touch display screen, the coin-feed and card reading operation interface and the input keyboard are both exposed from the first face casing of the casing so that all operation ports are integrated on one surface of the self-service lottery machine and the arrangement of the operation ports is more centralized. The structure of the coin-feed and card reading integrated module is integrated so as to facilitate reduction of the self-service lottery machine in volume.

DETAILED DESCRIPTION

In order to make the purpose, the technical solution and the advantageous clearer, detailed description of the present invention will be set forth with reference to the drawings and the embodiment.

The self-service lottery machine in the embodiment of the invention comprises an accommodate space formed by a casing, wherein the self-service lottery machine further comprises:

a display device for providing a lottery self-service sales operation interface, the display device including a touch display screen;

a coin-feed and card reading integrated module for completing payment, the coin-feed and card reading integrated module including a coin-feed and card reading operation interface;

a data input module for implementing keyboard input, the data input module including an input keyboard; and a main board for completing lottery self-service sales according to user's operation received by the data input module, the coin-feed and card reading integrated module and the display device, wherein the display device, the coin-feed and card reading integrated module, the data input module and the main board are arranged inside the accommodation space, and the touch display screen, the coin-feed and card reading operation interface and the input keyboard are all exposed from a first face casing of the casing.

The self-service lottery machine in the present invention comprises a display device, a coin-feed and card reading integrated module, a data input module and a main board. The display device is used for providing users with operation interfaces in lottery self-service sales and receiving operation input performed by the user on the touch display screen. The coin-feed and card reading integrated module is used for completing payment of lottery self-service sales. The data input module is used for receiving data input performed by the user via a keyboard, and the main board is used for controlling the work among the components above. The combination of the components realizes the self-service sales of lotteries. Moreover, the touch display screen, the coin-feed and card reading operation interface and the input keyboard are both exposed from the first face casing of the casing so that all operation ports are integrated on one surface of the self-service lottery machine and the arrangement of the operation ports is more centralized. The structure of the coin-feed and card reading integrated module is integrated so as to facilitate reduction of the self-service lottery machine in volume.

Furthermore, preferably, the main board also uses an integrated structure to better facilitate reduction of the self-service lottery machine in volume.

Figure 1:
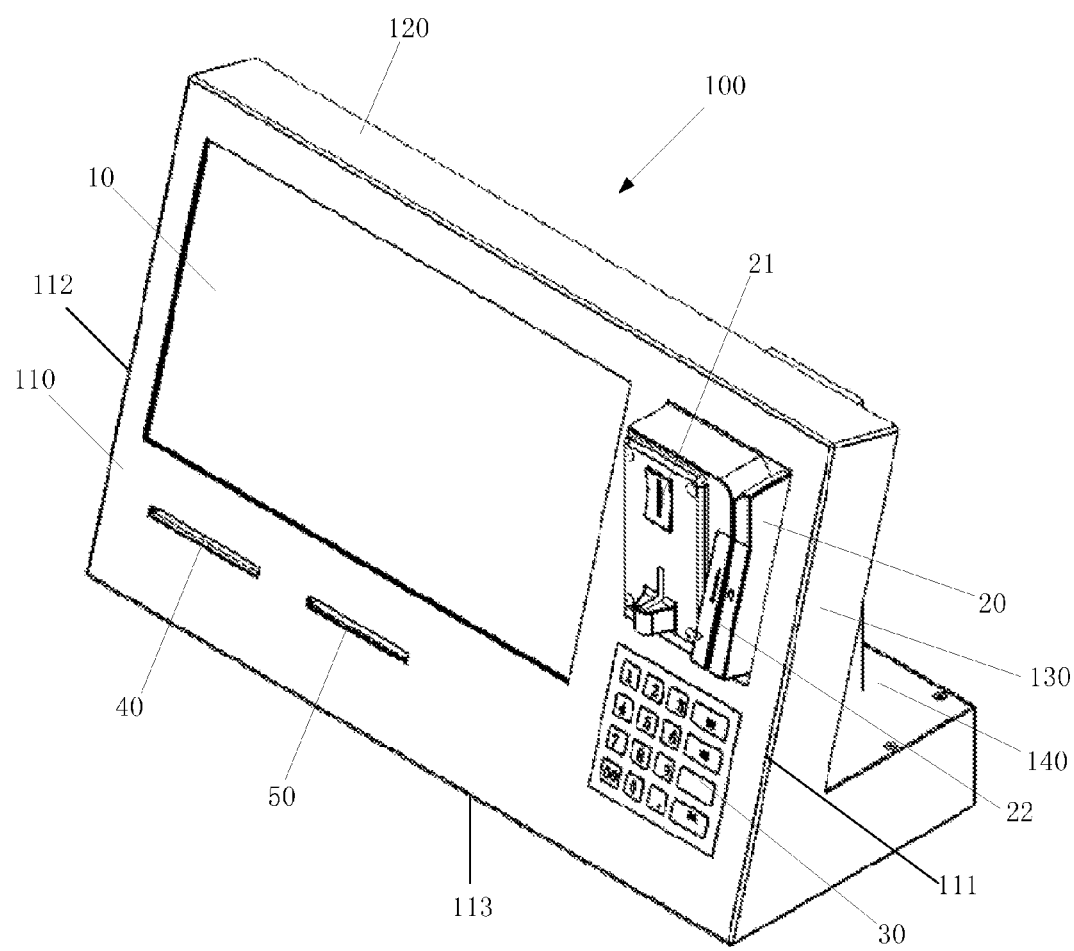
FIG. 1 is a schematic diagram of the three-dimensional structure of a self-service lottery machine as described in the embodiment of the invention.
Figure 3:
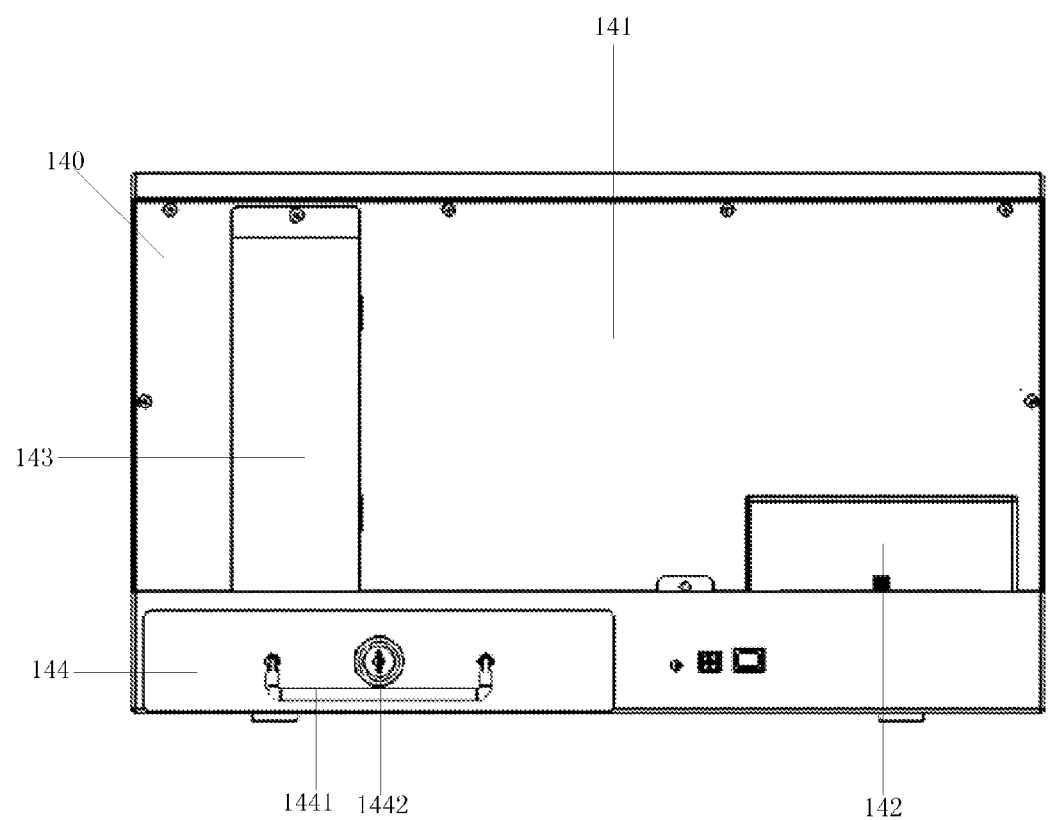
FIG. 3 is a back view of a self-service lottery machine as described in the embodiment of the invention.

FIG. 1 is a schematic diagram of the three-dimensional structure of a self-service lottery machine as described in the embodiment of the invention. Combined with FIG. 1, a self-service lottery machine 100 in the embodiment of the invention comprises a casing including a first face casing (front casing) 110 for arranging operation interfaces, a top casing 120 connected with the first face casing 110, a bottom casing 150 (see FIG. 7) and two side casings 130, wherein the bottom casing 150 is used for placing the self-service lottery machine 100 on the ground, and has a width greater than the top casing 120 so that the side casings 130 are formed to be a "L" shape. Furthermore, the casing further comprises a second face casing (rear casing) 140 connecting the two side casings 130, the top casing 120 and the bottom casing 150. With reference to FIG. 3, the combination of the second face casing 140 with the first face casing 110, the top casing 120, the two side casings 130 and the bottom casing 150 forms a closed accommodation space.

In the embodiment of the invention, the two side casings 130 are formed to be a "L" shape respectively, and an angle of the first face casing 110 relative to the bottom face 150 is less than 90 degrees and greater than 0 degree.

A display device for providing a lottery self-service sales operation interface, a data input module for implementing keyboard input, a coin-feed and card reading integrated module for completing payment, a main board for completing lottery self-service sales according to user's operation received by the data input module, the coin-feed and card reading integrated module and the display device, a print module for printing lotteries, and a scan module for scanning sold lotteries are all arranged in the closed accommodation space formed by the casing.

Preferably, the main board is an integrated computer main board to facilitate reduction of the self-service lottery machine in volume, and the main board is connected with the data input module, the coin-feed and card reading integrated module, the display device, the scan module and the print module respectively, and receives the signal of the modules respectively and controls the work thereof to complete the self-service sales of the lotteries.

Furthermore, the display device includes a touch display screen 10 combined on the first face casing 110 to be exposed from the first face casing 110, and the touch display screen 10 is capable of displaying operation interfaces to perform all kinds of operation easily and conveniently.

The coin-feed and card reading integrated module uses the integrated module design to facilitate reduction of the self-service lottery machine in volume. The coin-feed and card reading integrated module includes a coin-feed and card reading operation interface 20. The coin-feed and card reading operation interface 20 is combined on the first face casing 110 and exposed therefrom. To be specific, the coin-feed and card reading operation interface 20 includes a coin slot 21 and a card swiping opening 22. The information of various magnetic cards such as a Union Pay Card, a credit card and a rechargeable card is read via the card swiping opening 22. The user's payment for purchasing lotteries with coins is obtained by inserting coins into the coin slot 21, and the coin slot is designed particularly to avoid eating coins and have a fake coin recognition function.

Preferably, a card insertion port of the card swiping opening 22 is designed in an arc shape to better help to card inserting operation, and a front bottom surface of the card swiping opening 22 is parallel with the first face casing 110 so as so ensure that swiping card data is completed read, and misoperation such as failure in card swiping and incompleteness of data read is avoided.

Figure 4:
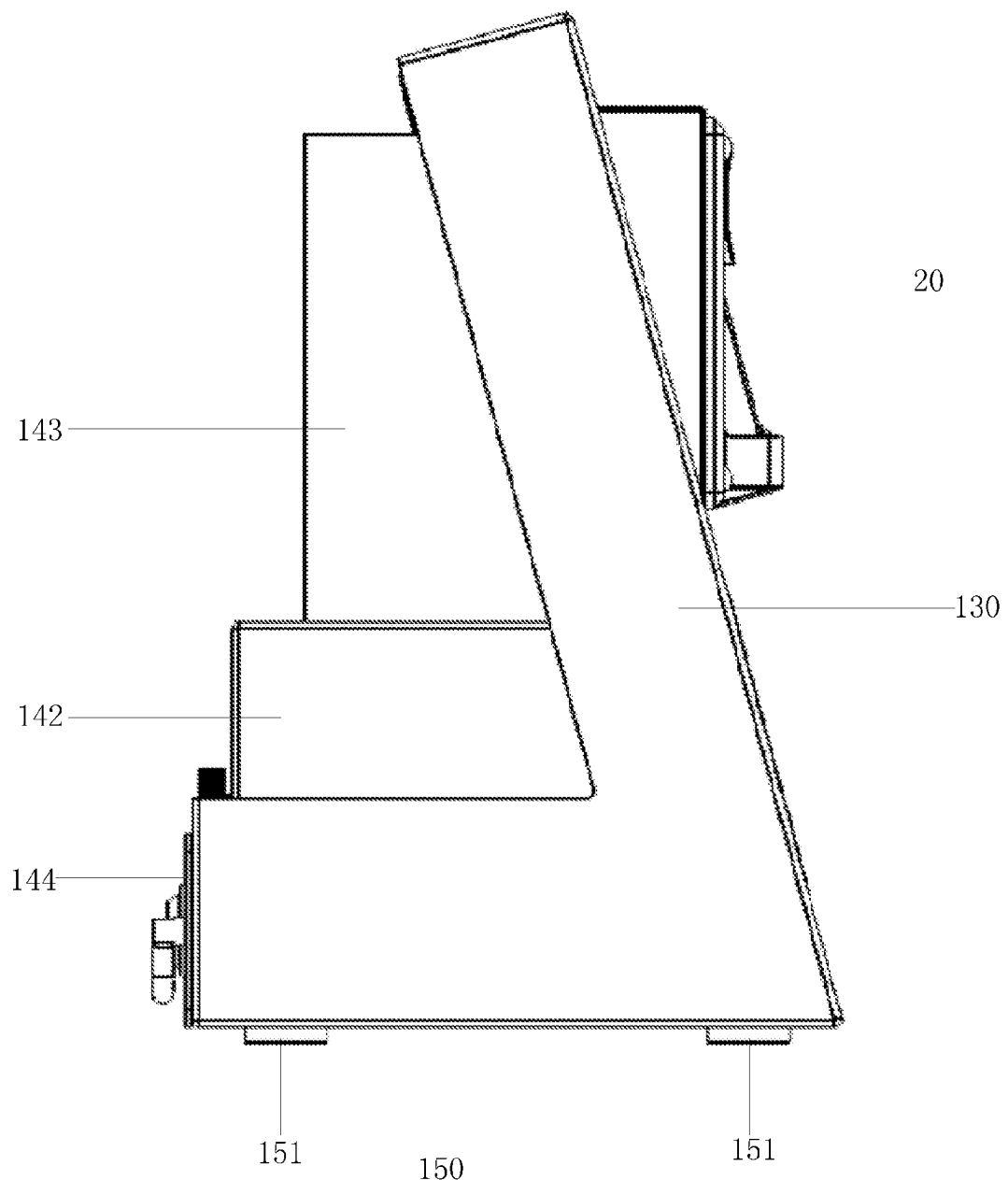
FIG. 4 is a left view of a self-service lottery machine as described in the embodiment of the invention.
Figure 5:
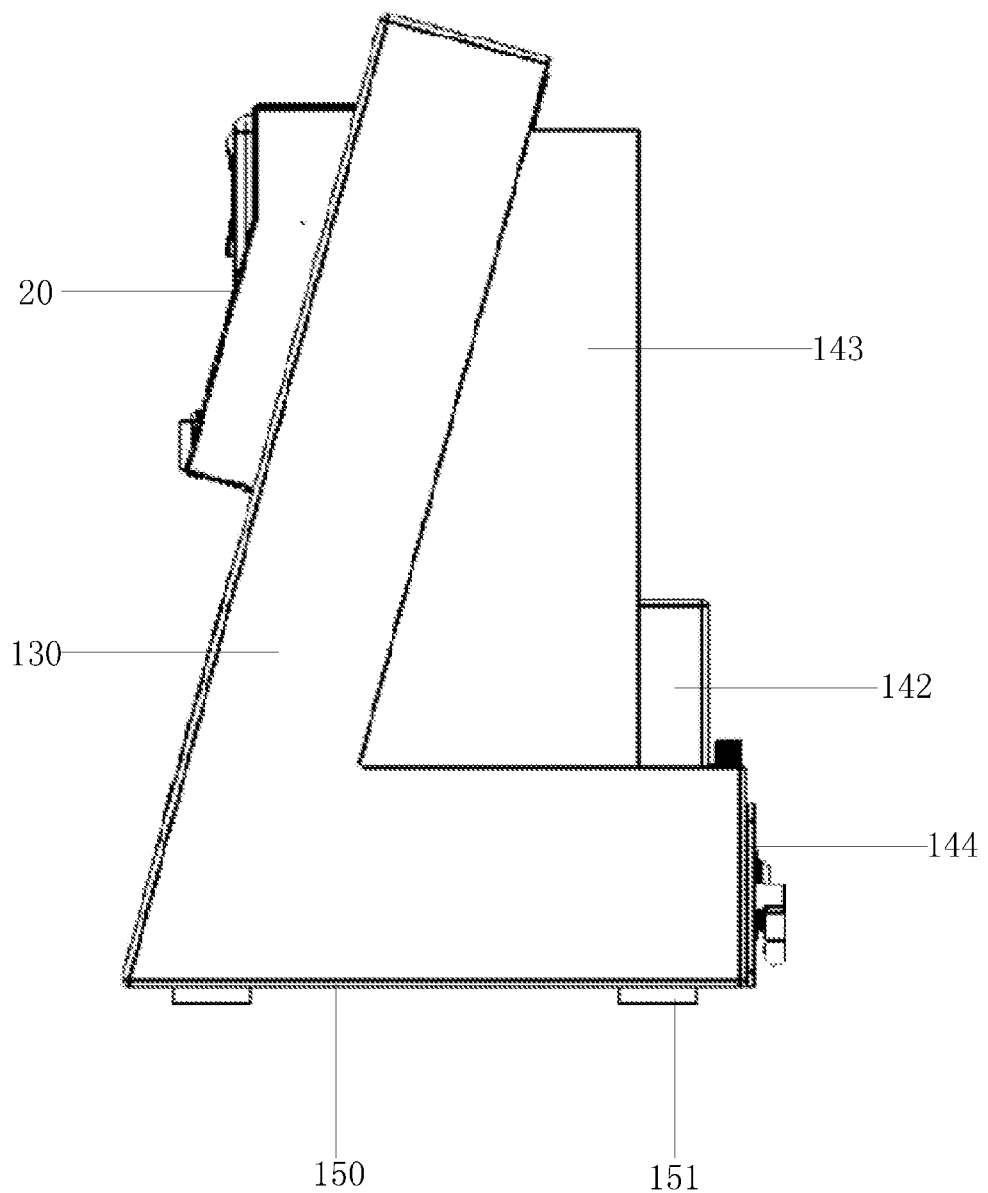
FIG. 5 is a right view of a self-service lottery machine as described in the embodiment of the invention.
Figure 6:
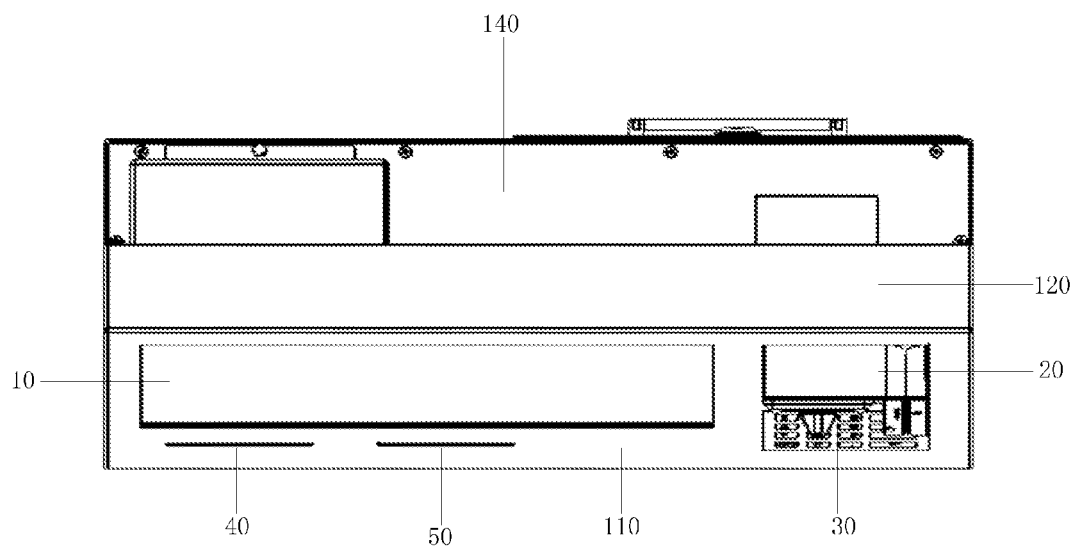
FIG. 6 is a top view of a self-service lottery machine as described in the embodiment of the invention.

With reference to left view of FIG. 4 and the right view of FIG. 5, the coin-feed and card reading operation interface is disposed protruding from the first face casing 110.

The data input module includes an input keyboard 30 combined on the first face casing 110 and exposed therefrom for inputting the card number, password, etc. of a magnetic card via the keyboard to encrypt.

The scan module includes a scan port 50 combined on the first face casing 110 and exposed therefrom for scanning the barcode information in a sold lottery to judge winning. To be specific, inside the scan port 50 is provided with a paper feeding guide groove to ensure that the barcode of the lottery exists on a scanning area horizontally.

The print module includes a print delivery outlet 40 combined on a first face casing 110 and exposed therefrom for printing sold lotteries. To be specific, the interior of the print delivery port 40 is provided with a paper feeding guide groove, and the height of a paper outlet of a print head of the print module is in abutting connection with the paper feeding guide groove of the print delivery outlet 40 in a parallel and level mode to ensure that lotteries enter into the print delivery outlet 40 smoothly.

Figure 2:
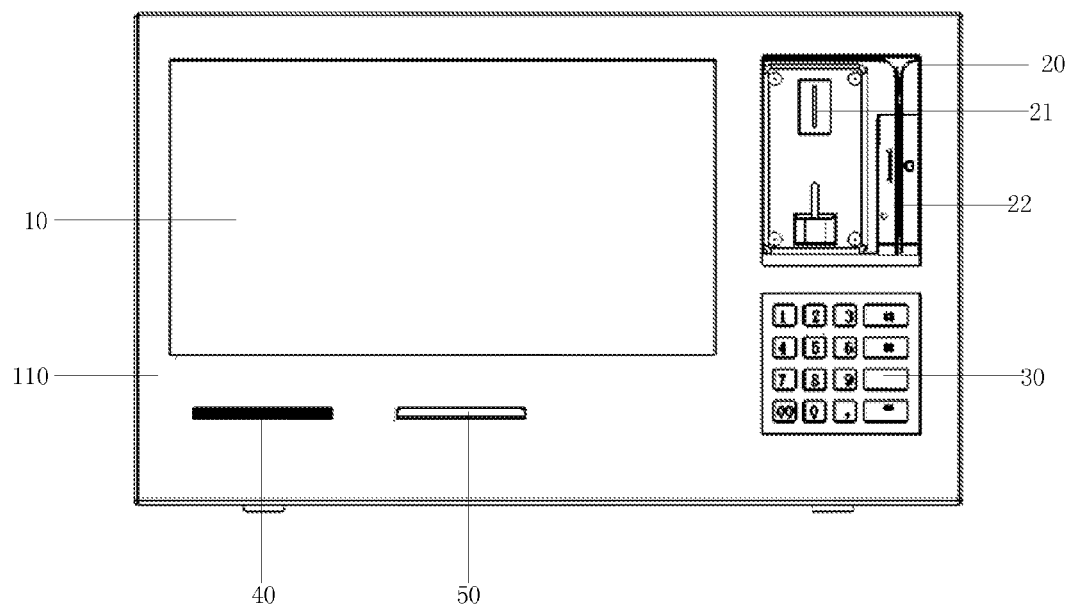
FIG. 2 is a front view of a self-service lottery machine as described in the embodiment of the invention.

FIG. 2 is a front view of a self-service lottery machine as described in the embodiment of the invention. According to FIG. 2 and FIG. 1, the first face casing 110 includes a first side 111 and a second side 112 which are opposite, and a third side 113 connected with the first side 111 and the second side 112 respectively, wherein the coin-feed and card reading operation interface 20 and the touch display screen 10 are arranged in sequence from the first side 111 toward the second side 112, the input keyboard 30 is arranged between the coin-feed and card reading operation interface 20 and the third side 113, the print delivery outlet 40 and the scan port 50 are arranged between the touch display screen 10 and the third side 113, and the print delivery outlet 40 and the scan port 50 are arranged side by side along a length direction of the third side 113.

In the embodiment of the invention, the first face casing 110 is arranged with a slight inclined structure with respect to an vertical surface, and the third side 113 is a side connected with a bottom casing 150. With the structure described above, the coin-feed and card reading operation interface 20 is arranged on the upper right of the first face casing 110 so that the coin slot 21 is arranged at a higher position of the self-service lottery machine to increase the height of coins dropping, thereby solving the problem of stacking phenomena resulted from dropping of coins into the money storage box to a certain extent.

FIG. 3 is a back view of a self-service lottery machine as described in the embodiment of the invention. With reference to FIG. 1 and FIG. 3, the second face casing 140 of the self-service lottery machine is situated behind the first face casing 110, and includes a main casing 141, a first closed casing 142 corresponding to the position where the print module is provided, a second closed casing 143 corresponding to the position where the coin-feed and card reading integrated module is provided and a third closed casing 144 for closing or exposing a money storage box.

As a person skilled in the art can understand, the self-service lottery machine is provided with a power interface, a network interface, a switch interface, etc., and with reference to FIG. 3, these interfaces are arranged on the second face casing.

With reference to FIGS. 3, 4, 5, 8 and 9, the third closed casing 144 is situated at the bottom of the second casing 140 and near the bottom casing 150. The third closed casing 144 is connected with a money storage box 60 inside the self-service lottery machine, i.e., the money storage box 60 is arranged at a position near the bottom casing 150 to increase the height of coins dropping. Most preferably, the third closed casing 144 is provided with a handle 1441 and a box closed lock catch 1442 for locking the money storage box. Use of the handle 1441 is convenient to pull out the money storage box 60, especially, more convenient in a case of a large number of coins. Use of the box closed lock catch 1442 ensures the safety of coins and helps to take the coins out of the money storage box 60.

The first closed casing 142 and the second closed casing 143 are formed to be a structure protruding from the main casing 141 respectively. With reference to FIG. 3, the first closed casing 142 and the second closed casing 143 are connected with other casings of the self-service lottery machine independently of the main casing so that the first closed casing and the second closed casing can be opened individually in a case of not opening the main casing, and the coin-feed and card reading integrated module and the print module are maintained conveniently, solving the problems of post maintenance and paper change and making the operation simply.

The self-service lottery machine further comprises a first power supply for supplying the display device, the coin-feed and card reading integrated module and the data input module with power energy, and the print module includes a second power supply for supplying print output with power energy, wherein the first power supply is different from the second power supply. By designing an independent power supply for the print module, it is possible to perform reset operation on the print module in a case of not closing general power supply (the first power supply) of the self-service lottery machine for easy resolution of abnormal printing.

Figure 8:
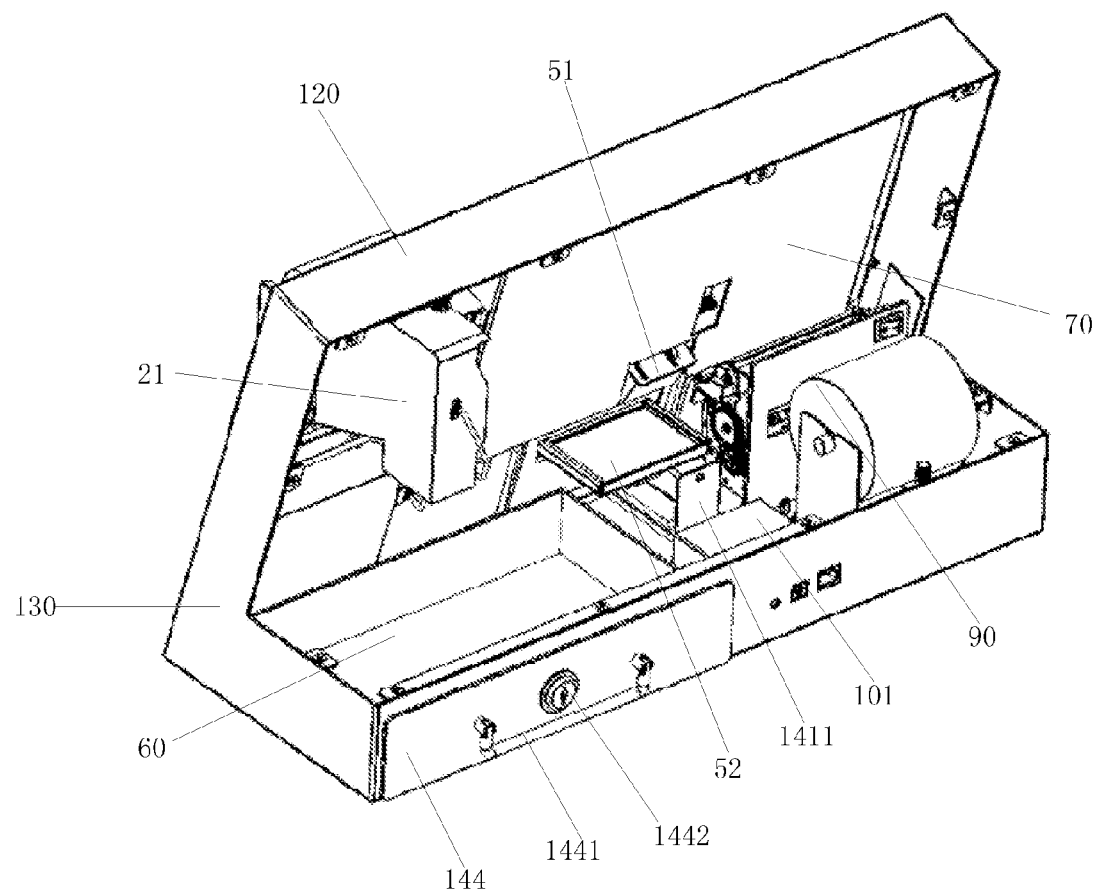
FIG. 8 is a schematic diagram of the first state where a rear casing of a self-service lottery machine as described in the embodiment of the invention is opened.
Figure 9:
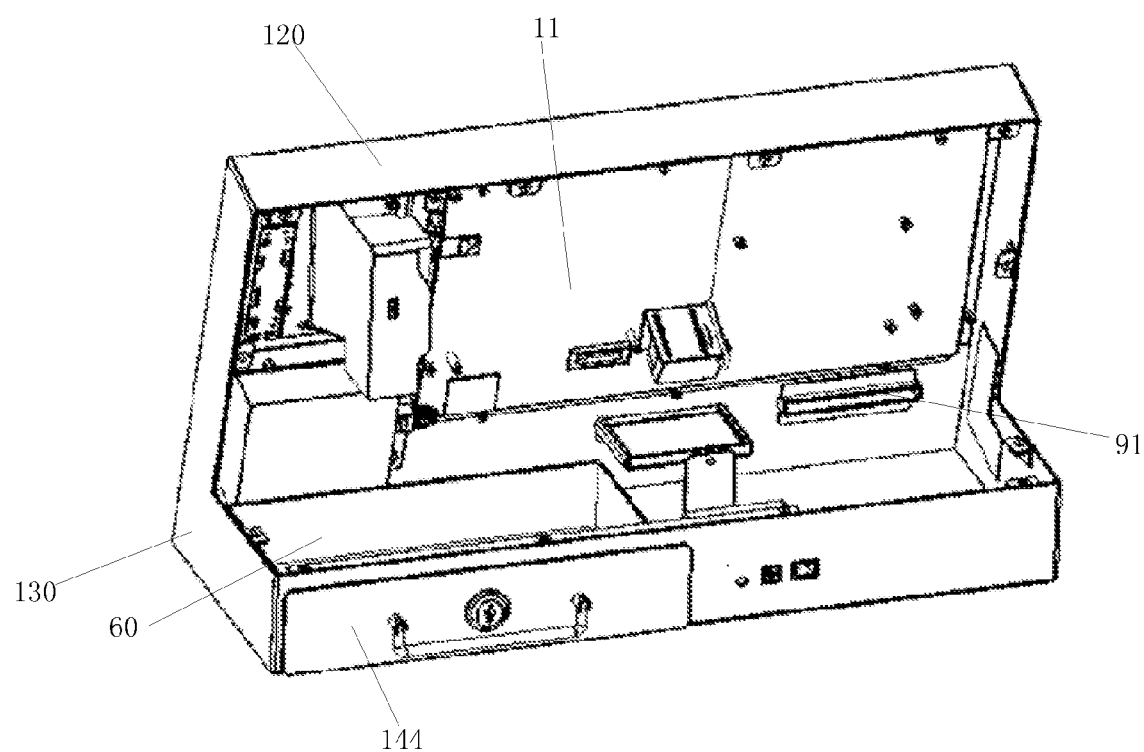
FIG. 9 is a schematic diagram of the second state where a rear casing of a self-service lottery machine as described in the embodiment of the invention is opened.

Referring to FIG. 3, the main casing 141 is provided with a complete machine lock catch 1411 for implementing a complete machine locking function so as to be safe and reliable. With reference to FIGS. 8 and 9, when the complete machine lock catch 1411 is opened, a main board cover plate 70 therein is exposed for convenience of maintenance of the whole machine.

According to FIG. 8, the bottom of the accommodation space inside the self-service lottery machine is proved with a money storage box 60 and a print module 90 side by side, between which is an interface board cover plate 101 of the first power supply and the complete machine lock catch 1411. Above the complete machine lock catch 1411 is a scan module 51 including a paper feeding platform 52 of the scan port. The position of the paper feeding platform 52 of the scan port on the first face casing 110 is the position of the scan port 50. Furthermore, above the scan module 51 is a computer main board cover plate 70 arranged in parallel with the first face casing 110. Above the money storage box 60 is a coin-feed and card reading integrated module 21, corresponding to the position of the coin-feed and card reading operation interface 20 in the first face casing 110.

FIG. 9 is a structural diagram of the interior of the self-service lottery machine from which the print module 90 and the computer main board cover plate 70 are removed. According to FIG. 9, inside the accommodation space, a touch display screen cover plate 11 is arranged at the position corresponding to the touch display screen 10, and arranged between the first face casing 110 and the computer main board cover plate 70. Furthermore, a printing paper outlet 91 is arranged at the position corresponding to the print module 90, and in communication with the outer surface of the first face casing 110 to form a print delivery outlet 40.

Figure 7:
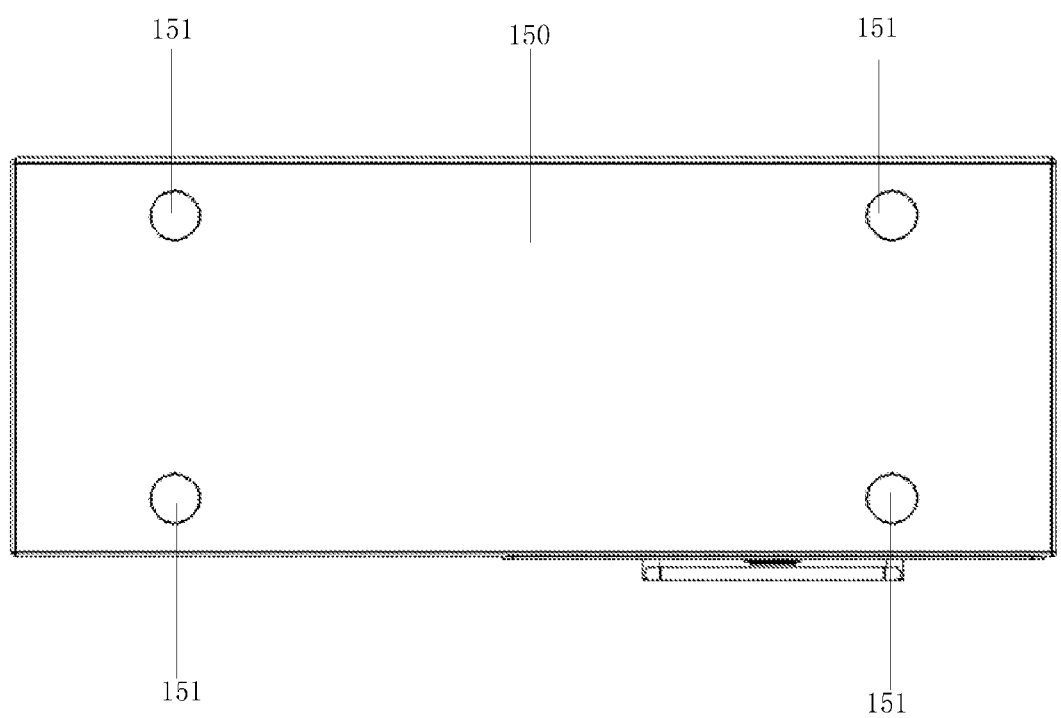
FIG. 7 is a bottom view of a self-service lottery machine as described in the embodiment of the invention.

Furthermore, referring to FIG. 7, more preferably, according to the self-service lottery machine in the embodiment of the invention, a bottom casing 150 is provided with fool pads 151. When the self-service lottery machine is placed, the pads 151 come into contact with the surface supporting the self-service lottery machine, preventing the abrasion of the bottom casing 150. Preferably, the food pads 151 are made of anti-sliding materials to achieve the optimum anti-sliding effect.

According to the structure of the parts of the self-service lottery machine in the invention, users may select the type and number of lotteries to be bought at their own disposal using the touch display screen 10, and select the mode of payment suitable for themselves using the coin-feed and card reading operation interface 20, such as inserting a coin or swiping a Union Pay Card, and complete inputting of a card number and a password using the input keyboard 30 when paying via the Union Pay Card, print the purchased lotteries automatically using the print delivery outlet 40 after completed the payment, scan the lotteries using the scan port 50 when drawing winning numbers to judge winning. Thus, with the self-serve lottery machine, the users can complete the whole purchasing process, and the operation thereof is simple and convenient without involving any special operation.

Furthermore, according to the self-service lottery machine of the invention, the display device, the coin-feed and card reading integrated module, the data input module and the main board are all arranged in one accommodation space, and the structure of the main board and the coin-feed and card reading integrated module are integrated so that the self-service lottery machine is small in volume, and can be used flexibly and conveniently and placed at any terminal node such as a lottery shop, supermarket, a game room and a news stand for sale. Moreover, cloud technology is used for unified management, and online collecting, running and processing of relevant data are all accomplished by cloud computation, which is safe, convenient and fast.

According to the above description, the self-service lottery machine in the embodiment of the invention has the following advantageous effect:

High integrated design results in small volume and flexible and convenient placement;

the complete machine and the money storage box are both provided with a locking function, ensuring the safety of the complete machine and coins;

the closed casings of the coin-feed card feeding integral module and the print module are arranged separately from the main casing respectively, solving the problems of post maintenance and paper change and making operation convenient;

the design of the coin-feed card feeding integral module is simple and beautiful, and the design that the card swiping opening is on the right side of the integral module conforms to man's operation;

the card insertion port placed at the card swiping opening is designed in an arc shape, facilitating the insertion of a card into the card slot;

the front bottom surface of the card swiping opening is parallel with the first face casing (front casing), ensuring complete reading of card swiping data and avoiding misoperation such as failure in card swiping and incompleteness of data read;

the coin slot is arranged at a highest point of the self-service lottery machine, increasing the height of coins dropping and solving thereby solving the problem of coin stacking phenomena to a certain extent;

the money storage box is provided with a handle, facilitating pull-out of the money storage box in a case of a large number of heavy coins;

Inside the scan port is provided with a paper feeding guide groove, ensuring that the barcode of the lottery exists on a scanning area horizontally.

The print mode is provided with an independent power switch for control, capable of performing reset operation on the print module in a case of not closing general power supply (the first power supply) of the self-service lottery machine for easy resolution of abnormal printing;

Inside Lottery printing paper outlet 91 is provided with a paper feeding guide groove, capable of avoiding paper jam;

The bottom of a complete machine is provided with foot pads, capable of preventing abrasion of the bottom casing.

The above description only shows some embodiments of the invention, and it should be pointed out that, for a person skilled in the art, many improvements and modifications can be made without departing from the principle of the invention, and all these improvements and modifications fall into the protection scope of the invention.

What is claimed is:

1. A self-service lottery machine, comprising:
  a casing comprising a first face casing and a second face casing opposite to the first face casing, wherein the casing defines an accommodation space;

a display device for providing a lottery self-service sales operation interface, the display device comprising a touch display screen;

a coin-feed and card reading integrated module for completing payment, the coin-feed and card reading integrated module comprising a coin-feed and card reading operation interface;

a data input module for implementing keyboard input, the data input module comprising an input keyboard;

a print module for printing lotteries, the print module comprising a print delivery outlet; and a main board for completing lottery self-service sales according to user's operation received by the data input module, the coin-feed and card reading integrated module, the print module, and the display device, wherein the display device, the coin-feed and card reading integrated module, the data input module, the print module, and the main board are arranged inside the accommodation space, and the touch display screen, the coin-feed and card reading operation interface, the print delivery outlet, and the input keyboard are all exposed from the first face casing of the casing, and wherein the second face casing comprises a main casing, a first closed casing corresponding to the position where the print module is provided, a second closed casing corresponding to the position where the coin-feed and card reading integrated module is provided, and a third closed casing for providing access to a money storage box.

2. The self-service lottery machine according to claim 1, wherein the self-service lottery machine further comprises:
a scan module for scanning sold lotteries, the scan module comprising a scan port,
wherein the scan module is arranged inside the accommodation space, and the scan port is exposed from the first face casing.

3. The self-service lottery machine according to claim 2, wherein a paper feeding guide groove is provided inside the print delivery outlet and the scan port.

4. The self-service lottery machine according to claim 3, wherein a height of a paper outlet of a print head of the print module is in abutting connection with the paper feeding guide groove of the print delivery outlet in a parallel and level mode.

5. The self-service lottery machine according to claim 1, wherein the self-service lottery machine further comprises:
a bottom casing connected to the first face casing, and two opposite side casings, each of the side casings connected to the first face casing and the bottom casing, wherein each of the side casings is formed to be a "L" shape, and an angle of the first face casing relative to the bottom casing is less than 90 degrees and greater than 0 degree.

6. The self-service lottery machine according to claim 5, wherein the first face casing is rectangular and comprises a first side and a second side which are opposite, and a third side formed at a place where the first face casing is connected with the bottom casing, the third side being connected with the first side and the second side respectively, wherein the coin-feed and card reading operation interface and the touch display screen are arranged in sequence from the first side to the second side, the input keyboard is arranged between the coin-feed and card reading operation interface and the third side, the print delivery outlet and the scan port are arranged between the touch display screen and the third side, and the print delivery outlet and the scan port are arranged side by side along a length direction of the third side.

7. The self-service lottery machine according to claim 1, wherein the money storage box is arranged at the bottom of the accommodation space, and the third closed casing is provided with a handle and a box closed lock catch for locking the money storage box.

8. The self-service lottery machine according to claim 7, wherein the print module and the money storage box are arrange side by side, the print module is arranged at the bottom of the accommodation space, the main board is positioned above the print module, a cover plate for fixing the main board is parallel with the first face casing and positioned at a position corresponding to the touch display screen, and the coin-feed and card reading integrated module is located right above the money storage box.

9. The self-service lottery machine according to claim 1, wherein the main casing is provided with a complete machine lock catch.

10. The self-service lottery machine according to claim 1, wherein the self-service lottery machine further comprises a first power supply for supplying the display device, the coin-feed and card reading integrated module, and the data input module with power energy; and a second power supply for supplying the print module with power energy, wherein the first power supply is different from the second power supply.

11. The self-service lottery machine according to claim 1, wherein the casing is provided with foot pads.

12. The self-service lottery machine according to claim 1, wherein the first closed casing and the second closed casing are formed to be a structure protruding from the main casing respectively, and the first closed casing and the second closed casing are arranged separately from the main casing respectively so that the first closed casing and the second closed casing can be opened individually in a case of not opening the main casing.

13. The self-service lottery machine according to claim 1, wherein the self-service lottery machine is further provided with a power interface, a network interface and a switch interface, and these interfaces are arranged on the second face casing.

14. The self-service lottery machine according to claim 1, wherein the coin-feed and card reading operation interface comprises a coin slot and a card swiping opening, a card insertion port of the card swiping opening is designed in an arc shape, and front bottom surface of the card swiping opening is parallel with the first face casing.

15. A self-service lottery machine, comprising:
a casing including a first face casing, wherein the casing defines an accommodation space;
a display device displaying a lottery self-service sales operation interface, wherein the display device includes a touch display screen operable to input a lottery number by a user;
a coin-feed and card reading integrated module operable to complete payment, wherein the coin-feed and card reading integrated module includes a coin-feed and card reading operation interface;
a data input module including an input keyboard for receiving keyboard input;
a print module printing lotteries, wherein the print module includes a print delivery outlet that outputs a lottery ticket with the lottery number;
a scan module scanning sold lotteries, wherein the scan module includes a scan port that scans the lottery ticket with the lottery number to determine whether the lottery number is a winning number; and a main board operable to complete lottery self-service sales according to the user's operation received by the data input module, the coin-feed and card reading integrated module, the print module, the scan module, and the display device, wherein the display device, the coin-feed and card reading integrated module, the data input module, the print module, the scan module and the main board are arranged inside the accommodation space, and the touch display screen, the coin-feed and card reading operation interface, the print delivery outlet, the scan port, and the input keyboard are exposed from the first face casing of the casing.

16. The self-service lottery machine according to claim 15, wherein the self-service lottery machine further comprises:

a bottom casing connected to the first face casing; and two side casings opposite to each other, wherein each of the side casings is connected to the first face casing and the bottom casing, each of the side casings is formed to be a "L" shape, and an angle of the first face casing relative to the bottom casing is less than 90 degrees and greater than 0 degree.

17. The self-service lottery machine according to claim 16, wherein:

the first face casing is rectangular and comprises a first side and a second side which are opposite, and a third side formed at a place where the first face casing is connected with the bottom casing, the third side being connected with the first side and the second side respectively, and the coin-feed and card reading operation interface and the touch display screen are arranged in sequence from the first side to the second side, the input keyboard is arranged between the coin-feed and card reading operation interface and the third side, the print delivery outlet and the scan port are arranged between the touch display screen and the third side, and the print delivery outlet and the scan port are arranged side by side along a length direction of the third side.

* * * * *